United States Patent [19]

Nawrocki et al.

[11] Patent Number: 5,080,949
[45] Date of Patent: Jan. 14, 1992

[54] HEAT SHIELD WITH MOUNTING MEANS FOR USE IN A VEHICLE POWERED BY AN INTERNAL COMBUSTION ENGINE

[75] Inventors: Donald A. Nawrocki, Clarkston, Mich.; Joseph Pfeifer, LaGrange, Ga.; Michael Scislowicz, Utica, Mich.

[73] Assignee: Goetze Corporation of America, Troy, Mich.

[21] Appl. No.: 444,892

[22] Filed: Dec. 4, 1989

[51] Int. Cl.[5] .......................... B32B 1/04; B32B 3/02; B32B 3/06
[52] U.S. Cl. .......................................... 428/75; 428/68; 428/71; 428/74; 428/76; 428/99; 428/100; 428/131; 428/174; 428/192; 428/228; 428/920; 428/921
[58] Field of Search .................. 428/68, 71, 74, 75, 428/76, 99, 100, 131, 174, 192, 228, 920, 921

[56] References Cited

U.S. PATENT DOCUMENTS

| | | | |
|---|---|---|---|
| 2,017,377 | 10/1935 | Schemmel | 428/99 |
| 2,576,698 | 11/1951 | Russum | 428/75 |
| 3,003,902 | 10/1961 | McDuff | 428/75 |
| 3,031,358 | 4/1962 | Rutter et al. | 428/75 |

Primary Examiner—James J. Seidleck
Assistant Examiner—William P. Watkins, III
Attorney, Agent, or Firm—Spencer & Frank

[57] ABSTRACT

A heat shield is made by stacking a wrapper member made from sheet metal, a flexible ceramic fiber insulation member, and an outer member made from sheet material, and then bending over flanges which extend from the wrapper member. The stacked elements are then bent into the desired shape. To make a heat shield for spark plugs, a support member is also included in the stack and provides mounting legs for mounting the heat shield. To make a heat shield for a transmission unit, mounting hardware is connected to the stack with rivets.

4 Claims, 5 Drawing Sheets

HEAT SHIELD WITH MOUNTING MEANS FOR USE IN A VEHICLE POWERED BY AN INTERNAL COMBUSTION ENGINE

BACKGROUND OF THE INVENTION

The present invention is directed to a heat shield, and more particularly to a heat shield for use in a vehicle with an internal combustion engine, such as an automobile or truck. The present invention is also directed to a method for making such a heat shield.

Modern internal combustion engines are typically designed to have high working temperatures in order to provide high thermodynamic efficiency. The high thermodynamic efficiency reduces fuel consumption, but the high working temperatures of the engine are a source of great practical difficulty in construction and operation of the vehicle. The maximum temperature of combustion of gasoline in a cylinder approaches the melting point of platinum, and even the exhaust gas from an engine may have a temperature above the melting point of aluminum. Careful heat management is necessary to ensure that the components of an automobile can endure long years of reliable use in a high-temperature environment.

Heat shields are used increasingly in modern automobiles as a technique for managing heat. Since the heat management problems typically vary from one automobile model to the next, depending upon a number of factors such as engine horsepower and design, the layout of components under the hood, susceptibility of various components to deterioration due to high temperature, underhood airflow, and so forth, the exact configuration of the heat shields that are needed for optimum automotive performance will also vary from model to model.

For several years the assignee of the present application has sold manifold heat shields for preventing vapor lock by shielding gasoline conduits from engine heat, thereby reducing the chance that the gasoline might vaporize before reaching the fuel injectors. The manifold heat shield included a wrapper member stamped from sheet metal. The wrapper member had a cover portion and flanges extending from the cover portion. The flanges were bent to form a tray. A ceramic fiber insulation member was deposited in the tray without adhesive. The ceramic fiber insulation member was stamped from sheet material and had a shape congruent to the shape of the cover portion of the wrapper member. The manifold heat shield also included an outer member stamped from sheet metal and having a shape congruent to the shape of the cover portion of the wrapper member. The outer member was stacked without adhesive on top of the ceramic fiber insulation member and the flanges extending from the cover member were then folded over to press against the outer member along the periphery thereof. This formed a flat intermediate product.

The intermediate product was then bent at several places, using one or more stamping presses equipped with forming dies, to achieve the desired configuration for the manifold heat shield. Since each bend changed the shape and effective length of the workpiece as the respective bend was formed, separate die sets and ram strokes were employed for each bend. Although the workpiece could be moved from one press to another as the separate bends were formed, a single press with the necessary dies could be employed if the workpiece itself were moved from position to position between ram strokes.

After all the bends were formed in the workpiece, the manifold heat shield was completed by clipping hardware onto the bent workpiece. The completed manifold heat shield could then be installed in an automobile by bolting the hardware to the engine.

While the above-described manifold heat shield reduced the risk of vapor lock, experience has shown that the heat shield was insufficiently rugged for use in demanding applications. Relatively thick sheet metal was needed for the wrapper member in order to avoid deformations, and the clip-on mounting hardware did not secure the heat shield with the reliability that was desired Moreover, forming the desired bends in the manifold heat shield was relatively labor-intensive and thus expensive.

SUMMARY OF THE INVENTION

An object of the invention is to provide an easily-fabricated and rugged heat shield for use in vehicles with internal combustion engines. A related object is to provide a method for making such heat shields.

Another object of the invention is to provide a heat shield having a plurality of members which are made from sheet material, the members being secured to one another to form an intermediate product by flanges which extend from one of the members, the intermediate product being bent to achieve the desired configuration using a press equipped with staged, mobile forming dies.

Another object of the invention is to provide a heat shield having a plurality of members which are disposed in layers and which are secured to one another by flanges, the heat shield additionally having a support with a spine which is sandwiched between the layers and mounting legs which extend through gaps between the flanges.

Still another object of the invention is to provide a heat shield having a plurality of members which are disposed in layers and which are secured to one another to form an intermediate product by flanges which extend from one of the members, with mounting hardware being attached to the intermediate product by rivets.

In accordance with one aspect of the invention, these and other objects which will become apparent in the ensuing detailed description can be attained by providing a heat shield which includes a sheet metal wrapper member having a cover portion and flanges which extend from the cover portion, an insulating member which is made from flexible sheet material, with the insulating member contacting the cover portion of the wrapper member, a support having an elongated spine and mounting legs which extend from the spine, the spine being disposed between the cover portion of the wrapper member and the insulation member, and an outer member which is made from sheet material, with the outer member contacting the insulating member and with the flanges of the wrapper member being bent to press against the outer member so as to secure the outer member, insulating member, and support to the wrapper member without adhesive, wherein the cover portion of the wrapper member has a non-planar shape and the insulating member and the outer member conform to the non-planar shape.

In accordance with another aspect of the invention, a heat shield includes a sheet metal wrapper member having a cover portion with holes and having flanges which extend from the cover portion, an insulating member which is made from flexible sheet material, with the insulating member contacting the cover portion of the wrapper member and having holes which are aligned with the holes in the cover portion of the wrapper member, a sheet metal outer member having holes which are aligned with the holes in the insulating member and in the cover portion of the wrapper member, with the outer member contacting the insulating member and with the flanges of the wrapper member being bent to press against the outer member so as to secure the outer member and the insulating member to the wrapper member without adhesive, mounting hardware having holes, and rivets extending through the holes in the mounting hardware and the aligned holes in the outer member, insulating member, and cover portion of the wrapper member, wherein the cover portion of the wrapper member has a non-planar shape and the insulating member and the outer member conform to the non-planer shape.

In accordance with still another aspect of the invention, the above objects can be attained, in a method for making a heat shield, by making a sheet metal wrapper member having a cover portion and flanges extending from the cover portion, with the cover portion having a predetermined shape, bending the flanges with respect to the cover portion to form a tray, making an insulation member from flexible sheet material, the insulation member having a shape that is substantially congruent to the shape of the cover portion of the wrapper member, making an outer member from sheet material, with the outer member having a shape that is substantially congruent to the shape of the cover portion of the wrapper member, stacking the insulation member and the outer member in the tray so that the insulation member contacts the cover portion of the wrapper member and the outer member, bending the flanges so that the flanges press against the outer member to form a unitary, flat intermediate product, and then forming a plurality of bends in the intermediate product during a single ram stroke of a press equipped with staged mobile die sets.

DESCRIPTION OF THE PREFERRED EMBODIMENTS

Figures 6, 7, 8:
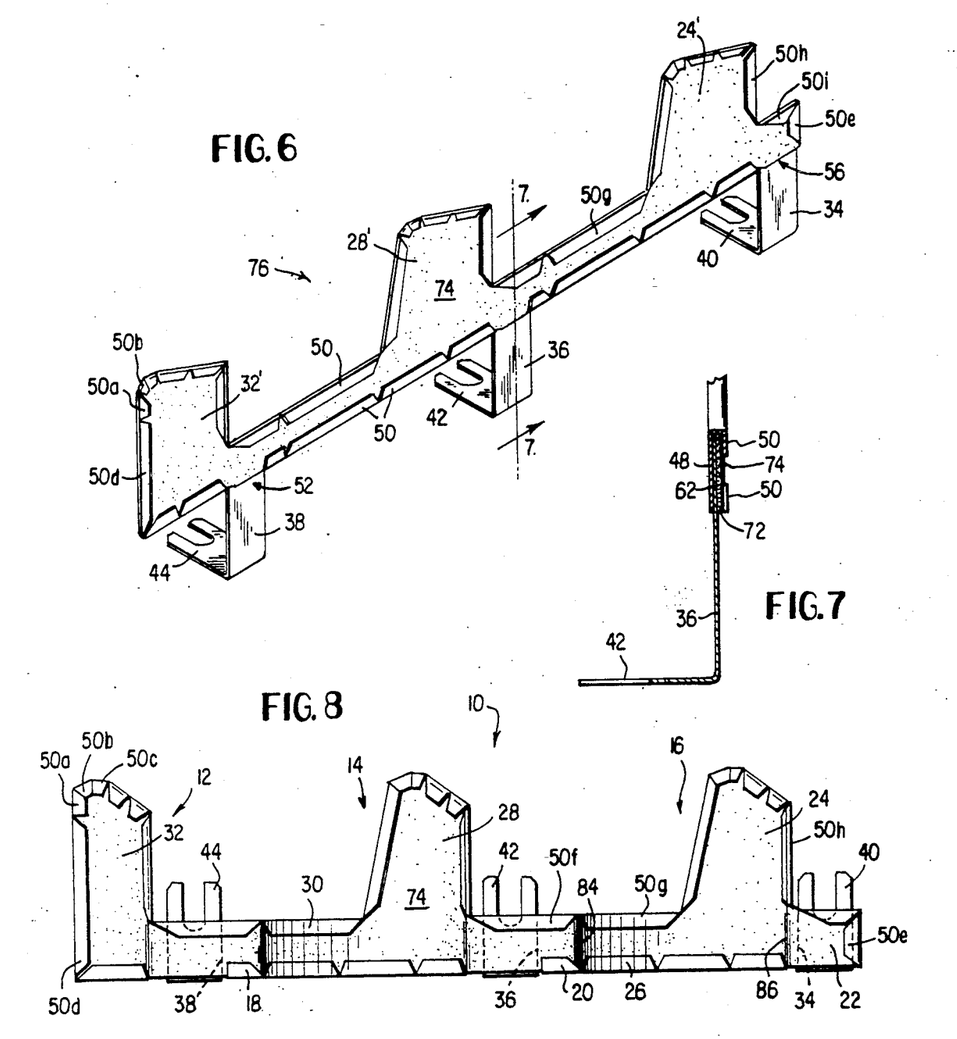
FIG. 6 is a perspective view illustrating an intermediate product formed when the flanges are folded over against the outer member and the stubs of the support are bent.
FIG. 7 is a sectional view taken along lines 7—7 of FIG. 6.
FIG. 8 is a front elevational view of the completed heat shield of the first embodiment after the intermediate product of FIG. 6 has been formed to provide arcuate regions.
Figure 9:
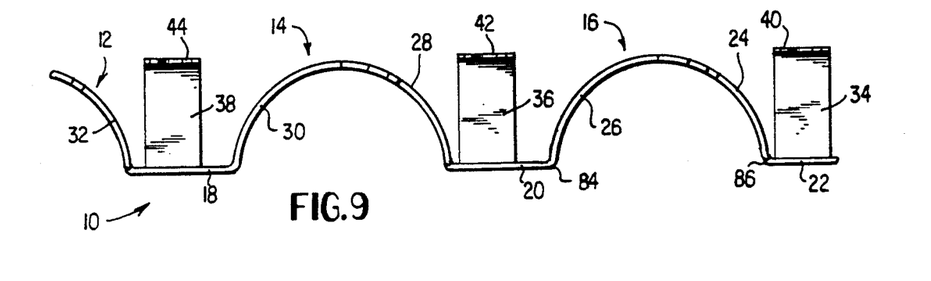
FIG. 9 is a top plan view of the completed heat shield as shown in FIG. 8.

A completed spark plug heat shield 10 in accordance with a first embodiment of the present invention is shown in FIG. 8 (front elevational view) and FIG. 9 (top plan view). Heat shield 10 includes three arcuate portions 12, 14, and 16 and three flat portions 18, 20, and 22. Arcuate portion 16 includes a lobe 24 and a connector strip 26 and, similarly, arcuate portion 14 includes a lobe 28 and a connector strip 30. Arcuate portions 14 and 16 are generally semi-circular in shape, with the lobes 24 and 28 each subtending about 90° of an arc and with connector strips 26 and 30 each subtending about 90° of an arc. Arcuate portion 12 includes only a lobe 32, subtending about 90° of an arc. (The arcuate portions 14 and 16 may be slightly hyperbolic in shape instead of semi-circular). Arcuate portions 12, 14, and 16 and flat portions 18, 20, and 22 are supported by legs 34, 36, and 38, which terminate respectively at slotted feet 40, 42, and 44.

Figure 10:
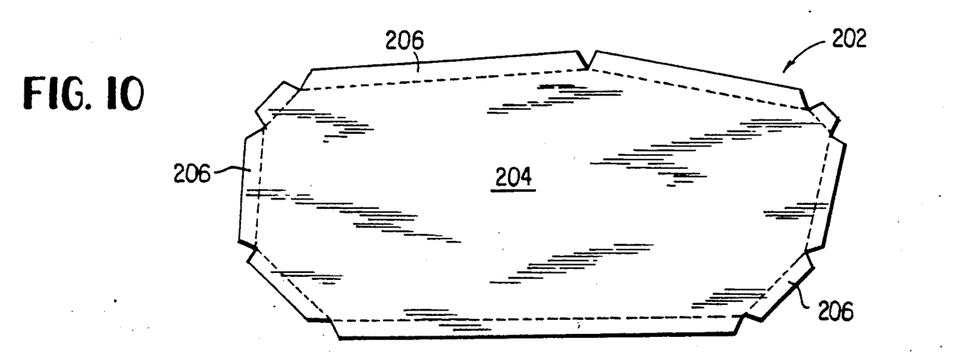
FIG. 10 is a top plan view of a wrapper member for heat shield in accordance with a second embodiment of the present invention before the flanges are bent to form a tray.

Heat shield 10 is configured for use with a 3.0 liter V-8 gasoline engine (not illustrated) for an automobile (not illustrated). Two heat shields 10 are used with each engine, one on either side. A row of four spark plugs (not illustrated) is present on each side of the engine, and the lobes 24, 28, and 32 shield three of the spark plugs and their connecting cables from intense heat radiated by the engine. The layout of the particular engine for which heat shield 10 was designed is such that the last spark plug in the row and its associated cable do not need special shielding. Bolts (not illustrated) extend through the slots of feet 40, 42, and 44 to mount heat shield 10 on the engine, with the arcuate portions 14 and 16 partially surrounding two of the spark plugs.

The fabrication of heat shield 10 will now be described with reference to FIGS. 1-7.

Figure 1:
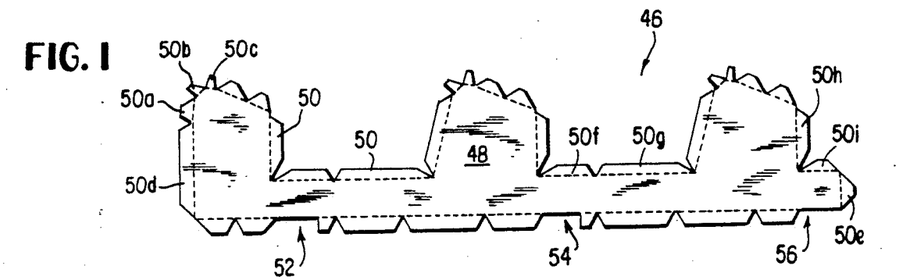
FIG. 1 is a top plan view of a wrapper member for a heat shield in accordance with a first embodiment of the present invention, and illustrates flanges before they are bent to form a tray.

The heat shield 10 includes a wrapper 46 as shown in FIG. 1. Wrapper 46 is made from a sheet (not illustrated) of aluminized steel. A stamping press (not illustrated) equipped with blank-through dies (not illustrated) is used to punch wrappers 46, having the configuration illustrated, from the sheet metal. Dotted lines are used in FIG. 1 to distinguish a cover portion 48 of the wrapper 46 from flanges 50. As will be noted from FIG. 1, the flanges 50 extend around the periphery of wrapper 46 except at regions 52, 54, and 56. It will be apparent that the flanges 50 are relatively short in regions where the lobes 24, 28, and 32 are sharply curved (for example, see flanges 50a, 50b, and 50c in FIGS. 1 and 8) and relatively long in regions where the lobes are not sharply curved (for example, see flanges 50d in FIGS. 1 and 8). A stamping press equipped with a contour punch (not illustrated) is used to bend the flanges 50 perpendicular to the cover portion 46. This forms a tray 58 (see FIG. 5) for receiving the remaining elements of heat shield 10, as will be discussed below.

Figure 2:
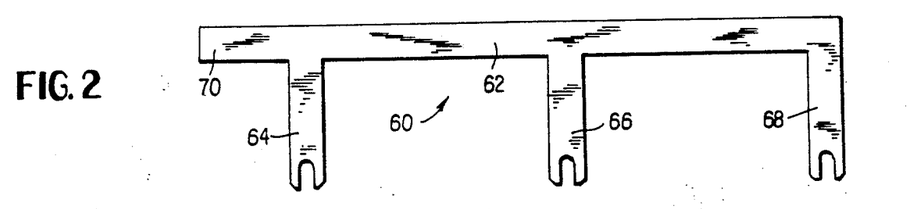
FIG. 2 is a top plan view of a support employed in the first embodiment to provide mounting legs.
Figure 3:
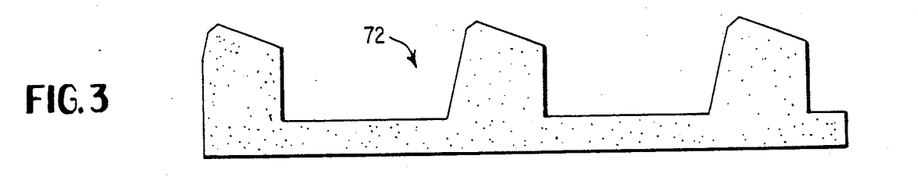
FIG. 3 is a top plan view of a flexible insulation member employed in the first embodiment.
Figure 4:
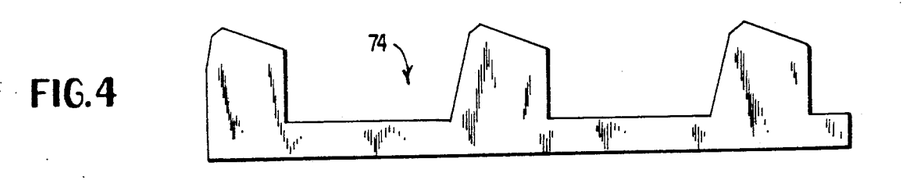
FIG. 4 is a top plan view of a laminated, electrically-insulating outer member employed in the first embodiment.

Heat shield 10 also includes a support 60 as shown in FIG. 2. Support 60 has an elongated spine 62 and three stubs 64, 66, and 68 extending from spine 62. A portion 70 of spine 62 extends beyond stub 64. Like wrapper 50, support 60 is made with a stamping press (not illustrated) equipped with suitably configured blank-through dies (not illustrated). However the sheet metal from which support 60 is made is preferably low-carbon steel which is zinc or nickel plated for corrosion resistance. The sheet metal (and, thus, support 50) is preferably about 1 mm thick—several times thicker than the sheet metal from which wrapper member 46 is made.

Heat shield 10 also includes a ceramic fiber insulation member 72 (see FIG. 3) and an outer foil member 74 (see FIG. 4). member 72 and 74 are also fabricated out of sheet material using blank-through dies (not illustrated) in stamping presses (not illustrated). The sheet material from which insulation member 72 is made is commercially available from Carborundum Company, Fibers Division, 850 Stephenson Highway, Suite 320, Troy, Mich. 48083, under the trademark "Fiberfrax." This material is flexible and somewhat spongy, and has a thickness of about ½ cm when not compressed. The sheet material from which foil member 74 is made has a layer of flexible electrical insulation laminated onto a relatively thick layer of aluminum foil. Suitable material is available from Allied Products Corporation, Acme Division, P.O. Box 1404, New Haven, Conn. 06505, under the trademark "Flexlam."

Figure 5:
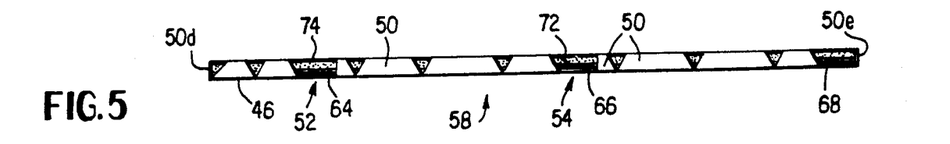
FIG. 5 is a bottom plan view illustrating the outer member, flexible insulation member, and support after they have been stacked into a tray formed by bending the flanges of the cover member.

Turning next to FIG. 5, support 60, ceramic fiber insulation member 72, and outer foil member 74 are stacked (without adhesive) one on top of the other in the tray 58, which is formed when the flanges 50 of wrapper 46 are bent at right angles to the cover portion 48 of wrapper 46 (see FIG. 1). Outer foil member 74 is positioned so that the electrically insulating layer faces outward. Stubs 64, 66, and 68 (see FIG. 2) extend respectively through openings in tray 58 provided by flangeless regions 52, 54, and 56 (see FIG. 1). The entire sandwich is compressed in a stamping press (not illustrated), and simultaneously the flanges 58 are rolled over and the stubs 64, 66, and 68 are bent at right angles, thus providing a semi-finished or intermediate product 76 as shown in FIG. 6. Bending stubs 64, 66, and 68 provides the legs 34-38 and the slotted feet 40-44 (FIG. 9) of the completed heat shield 10. Above legs 34-38, however, intermediate product 76 is flat, and lacks arcuate regions 12, 14, and 16 (see FIG. 9). The flat portion above legs 34-38 includes three flat lobes 24', 28S0, and 32', two relatively long lateral portions 78 and 80, and one relatively short lateral portion 82. The total length of intermediate product 76, from flange 50d at one end to flange 50e on the other end, is approximately 35 cm.

The final fabrication step, which results in the finished heat shield 10 as shown in FIGS. 8 and 9, will now be discussed with respect to FIG. 18. During this final fabrication step, the intermediate product 76 is bent so as to provide arcuate regions 12, 14, 16.

Figure 18:
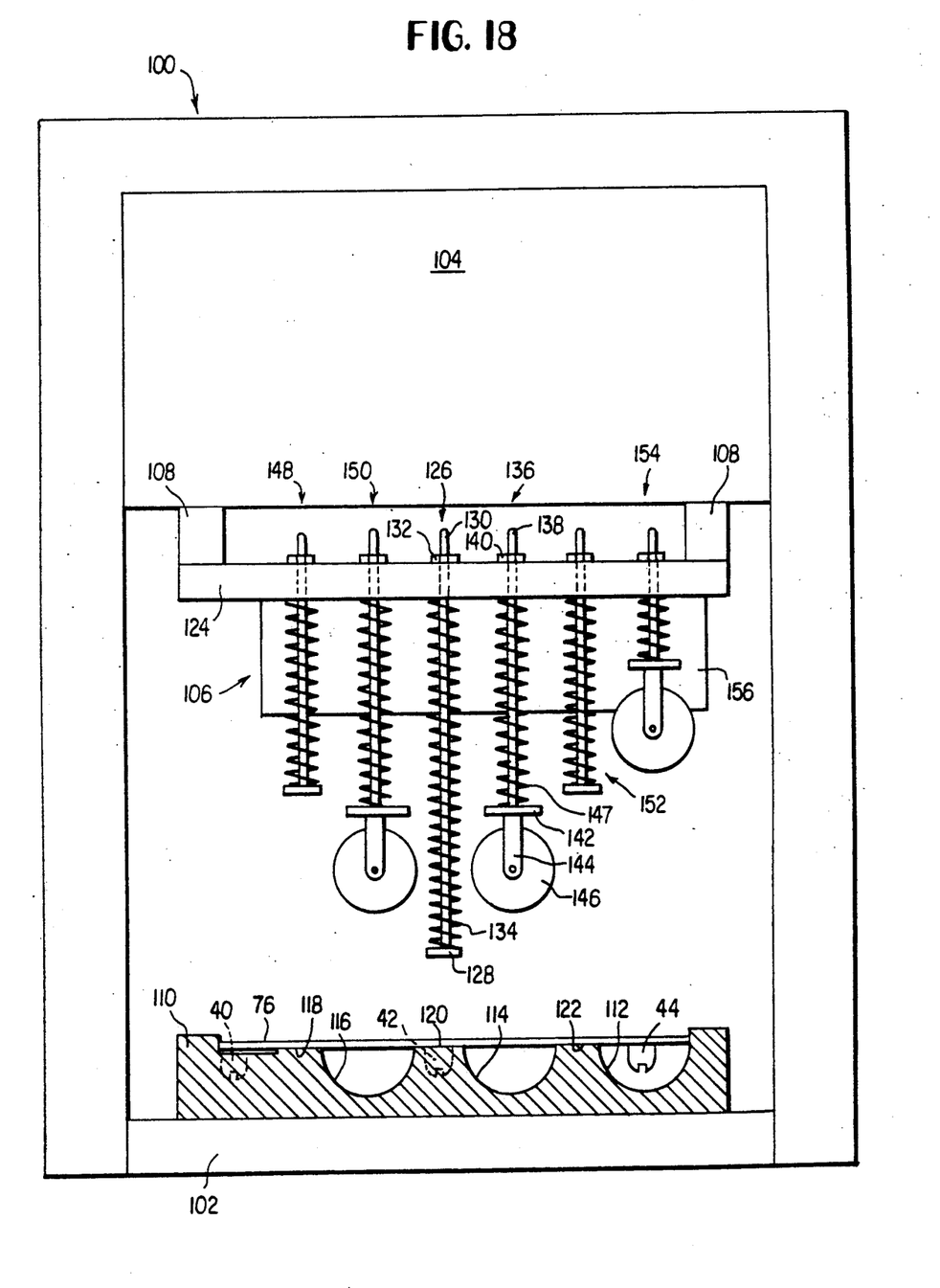
FIG. 18 is a front view schematically illustrating a press equipped with staged mobile die sets for framing the arcuate regions of the first embodiment in a single ram stroke.

FIG. 18 schematically illustrates a stamping press 100 having a bedplate 102 and a ram 104. Ram 104 can be lowered toward bed 102 in a downward press stroke or raised away from bed 102 in an upward press stroke. An upper die set 106 is attached to ram 104 by connectors 108. A lower die 110 is mounted on bed plate 102. The upper side of die 110 has a recess for receiving intermediate product 76. Cavities 112, 114, and 116 are provided at the floor of the recess. The floor of the recess also has anvil regions 118, 120, and 122.

With continuing reference to FIG. 18, upper die set 106 includes a support plate 124 which carries a plurality of staged mobil die sections. Die section 126 includes a foot member 128 which is attached to the lower end of a rod 130 which slidably extends through a bore in plate 124. Rod 130 has a threaded region adjacent its upper end, and a nut 132 is screwed onto the threaded region to keep rod 130 from being expelled from the bore. A spring 134 biases foot member 128 away from support plate 124.

Upper die set 106 also includes a die section 136 having a rod 138 which slidably extends through a bore in support plate 124. Rod 138 has a threaded region adjacent its upper end, and a nut 140 is screwed onto the threaded region. A yoke 142 is attached at the lower end of rod 138. A pair of arms 144 (only one of which is shown) extend from yoke 142, and a die wheel 146 is rotatably mounted between the arms 144. A spring 147 biases yoke 142 away from plate 124.

Upper die set 106 also includes die sections 148, 150, 152, and 154. Die sections 148 and 152 are constructed the same as die section 126, except their rods (corresponding to rod 130 of die section 138) are shorter. Die section 150 is constructed the same as die section 136. So is die section 154, except its rod (corresponding to rod 138 of die section 136) is shorter. Die sections 126, 136, and 148-154 are "staged," meaning that they come into play at different times when ram 104 is lowered, as will be described below. Although not shown, upper die set 106 includes bearings which keep the die sections from rotating about the axes of their respective rods.

During the downward stroke of ram 104, foot member 128 of die section 126 moves toward anvil region 120 of die 110. After foot member 128 contacts intermediate product 126, further downward motion of ram 104 presses intermediate product 176 against anvil region 120 and thereby effectively "pins" the center of intermediate product 106 to lower die 110 at the center of intermediate product 76. After further downward movement of ram 104, die wheel 146 of die section 136, and the corresponding die wheel of die section 150, press intermediate product 76 into cavities 114 and 116. Spring 127 of die section 136, and the corresponding spring of die section 150, are strong enough so that nut 140 and the corresponding nut of die section 150 are not raised from support plate 124 until arcuate regions 14 and 16 (see FIG. 9) are fully formed. As arcuate regions 14 and 16 are being formed, it will be apparent that slotted foot 44 moves toward anvil region 122 and that slotted foot 40 moves toward anvil region 118. Further downward movement of ram 104, after arcuate regions 14 and 16 are formed, presses the foot members of die sections 148 and 152 against intermediate product 76 above anvil regions 118 and 122. Finally, the die wheel of die section 154 presses intermediate product 76 into cavity 112 to form arcuate region 12 (see FIG. 9).

Upper die set 106 also includes a bending plate 156 which is affixed to support plate 124. Bending plate 156 is positioned to bend legs 34-38 (see FIG. 6) at right angles after all three arcuate regions are formed.

It will be apparent to those skilled in the art that, due to the use of staged mobile die sets (e.g., 126, 136, 148, 150, 152, and 154), intermediate product 76 can be bent to provide the finished heat shield 10 during a single ram stroke.

From FIG. 8 it should be noted that the flanges 50 are preferably positioned so that the sharp bends produced during the forming step are located between adjacent flanges 50. For example, sharp bend 84 between arcuate portion 16 and flat portion 20 is located between flanges 50f and 50g, and sharp bend 86 between arcuate portion 16 and flat portion 22 is located between flanges 50h and 50e. This keeps insulation member 72 and outer foil member 74 from being pinched excessively tight at the sharp bends, which would tend to tear the outer foil member 74. As a result of the forming step which provides arcuate regions 12, 14, and 16, the total length is reduced from about 35 cm (for intermediate product 76, FIG. 6) to about 26 cm (for the finished heat shield 10 of FIGS. 8 and 9). The maximum thickness of the sandwiched structure in the finished heat shield 10 is approximately 3 mm The presence of a relatively thick support 60 (see FIG. 2) in the stacked elements that are formed contributes substantially to the overall ruggedness of the finished heat shield 10, in addition to providing the mounting legs. As a result, relatively thin sheet metal can be used for wrapper member 46 without producing a flimsy product (it being noted that the curvature of lobes 24, 28, and 32 augments their rigidity).

Since flanges 50, outer foil member 74, ceramic fiber insulation member 72 (see FIG. 2), spine 62 (see FIG. 2) of support 60, and cover portion 48 (see FIG. 1) of wrapper 46 are located at progressively greater radii when intermediate product 76 (FIG. 6) is bent to provide the arcuate regions 12, 14, and 16 in FIG. 9, these different layers will shift slightly with respect to one another when arcuate regions 12, 14, and 16 are formed. To avoid excessive wrinkling the various layers are not adhesively attached to one another during fabrication. Furthermore the areas of ceramic fiber insulation member 72 and outer foil member 74 (when they are punched out of sheet material as previously described) are preferably slightly less than the area of cover portion 48 of wrapper 46 to minimize wrinkling when arcuate portions 12, 14, and 16 are formed. The gaps between the flanges 50 at the tops of lobes 24, 28, and 32 are also selected to be large enough so that the flanges 50 are not jammed together tightly enough to wrinkle one another during the forming step.

Finally, it should be noted that the insulation layer of cover member 74 faces outward toward the spark plugs (not illustrated). Furthermore the flanges 50 bear against the insulation layer. As a result, the aluminum foil layer of cover member 74 is not grounded, but instead "floats" electrically. In short, the insulation layer of cover member 74 is electrically effective twice, once between the spark plug and the aluminum foil layer and once between the aluminum foil layer and the flanges 50. Electrically, the aluminum foil layer forms a small-value capacitor with respect to the spark plug. This small-value capacitor is connected to ground (the engine) through a small-value capacitor between the aluminum foil layer and flanges 50 and a small-value capacitor between the aluminum foil layer and cover portion 48 of wrapper member 46.

A second embodiment of a heat shield in accordance with the invention will now be described with reference to FIGS. 10-17. The second embodiment is directed to a heat shield 200 (see FIGS. 16 and 17) which can be bolted to an engine (not illustrated) to protect a nearby transmission unit (not illustrated) from heat radiated by the engine.

FIG. 10 illustrates a wrapper 202, with dotted lines being used to distinguish the cover portion 204 of the wrapper from the flanges 206. Wrapper 202 is fabricated from sheet metal using a stamping press (not illustrated) equipped with blank-through dies (not illustrated), and thereafter flanges 206 are bent perpendicular to cover portion 204 using a contour punch (not illustrated). In a manner analogous to the first embodiment, this provides a tray to receive additional components.

Figure 11:
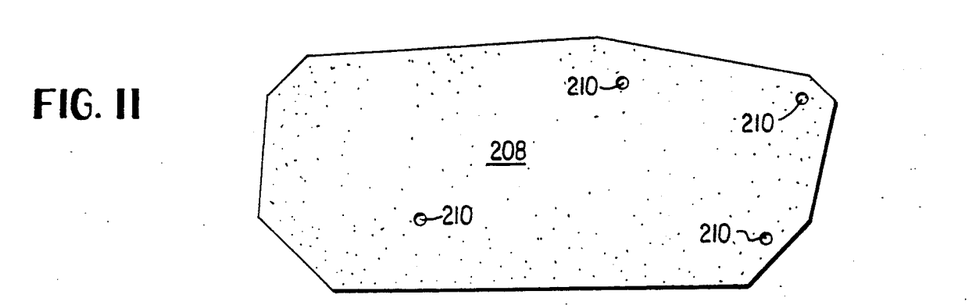
FIG. 11 is a top plan view of a flexible insulation member employed in the second embodiment.

FIG. 11 illustrates a ceramic fiber insulation member 208, which is the first component to be deposited (without adhesive) in the tray. It should be noted that holes 210 are punched in member 108.

Figure 12:
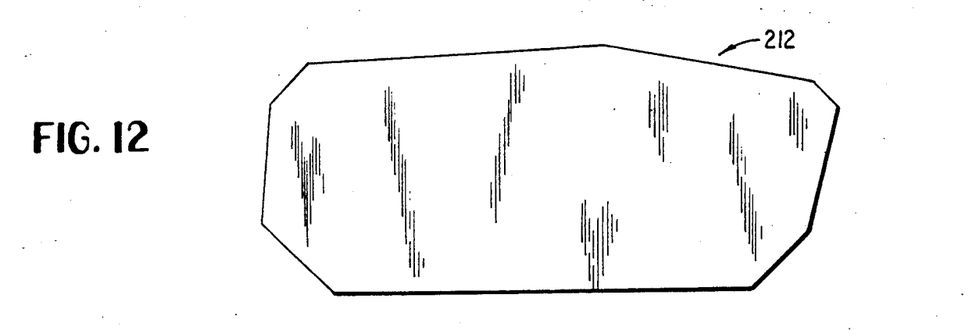
FIG. 12 is a top plan view of an outer member employed in the second embodiment.
Figure 13:
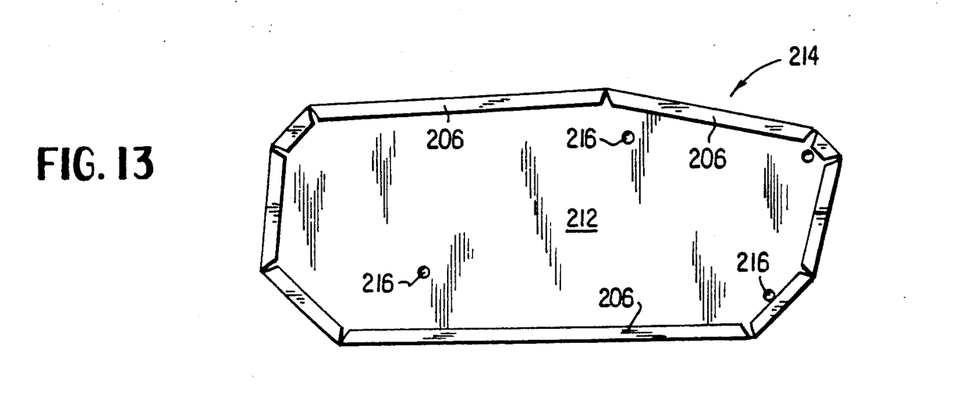
FIG. 13 is a top plan view of a first intermediate product which is formed when the flanges are folded over to press against the outer member.

FIG. 12 illustrates an outer member 212 which is punched out of sheet metal. Sheet metal can be used, instead of a laminated outer member 74 (see FIG. 4) as in the first environment, since member 212 is not used near the spark plugs and need not be electrically insulating. Outer member 212 is stacked (without adhesive) on the member 208 in the tray formed by bending the flanges 206 of wrapper 202. Thereafter a first intermediate product 214 as shown in FIG. 13 by folding the flanges 206 over and punching holes 216 through outer member 212 and cover portion 204 (see FIG. 10). Holes 216 are aligned with the holes 210 in insulation member 208 (see FIG. 11). When the holes 216 are punched, the metal of cover portion 214 is indented slightly toward the metal of outer member 212 and protrudes slightly through the holes 210 in insulation member 208. This effectively reduces the thickness of the material to be punched, in the immediate regions which are to receive holes 216, and thereby provides cleaner holes than would have resulted if holes 210 had not previously been punched in insulation member 208. First intermediate product 214 is generally flat.

Figure 14:
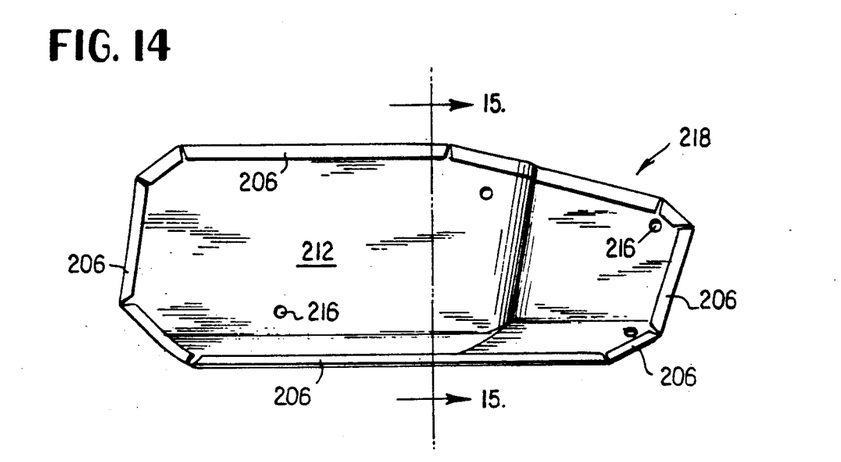
FIG. 14 is a top plan view of the first intermediate product after it has been formed and punched to provide a second intermediate product.
Figure 15:
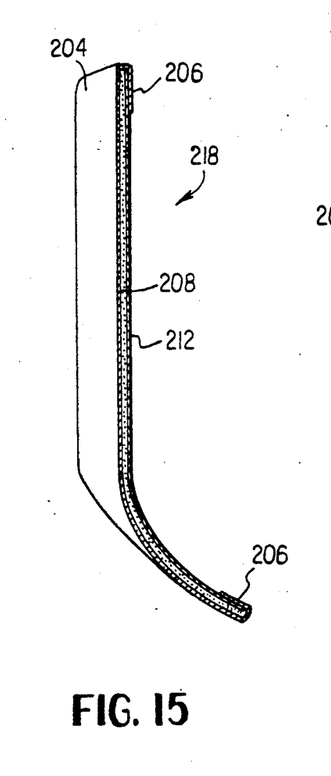
FIG. 15 is a sectional view taken along line 15—15 of FIG. 14.

First intermediate product 214 is then placed in a stamping press (not illustrated) equipped with staged mobile die sets (not illustrated) which bend the first intermediate product 214 into the configuration shown in FIGS. 14 and 15 (second intermediate product 218). FIG. 15 illustrates a cross section taken along line 15—15 of FIG. 14.

Figure 16:
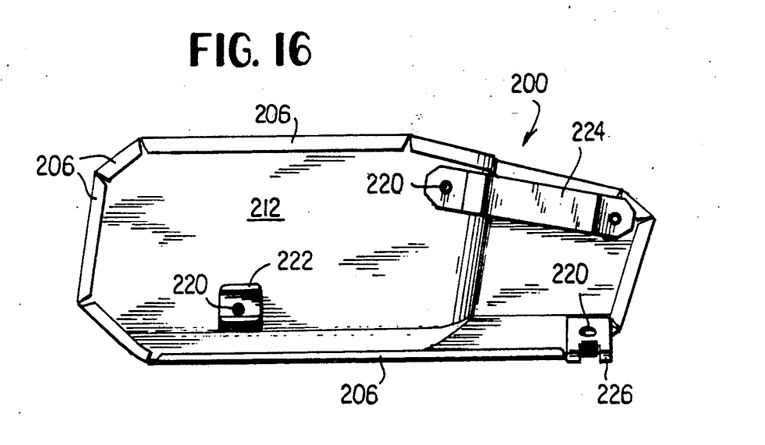
FIG. 16 is a top plan view of the second embodiment of the heat shield after mounting hardware has been attached to the second intermediate product with rivets.
Figure 17:
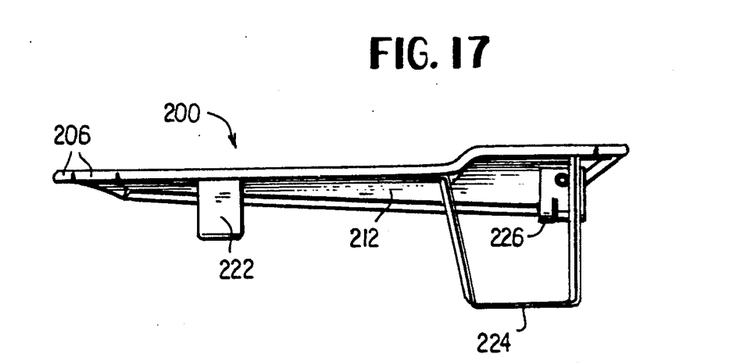
FIG. 17 is a side view of the second embodiment after the mounting hardware has been attached.

Finally, as shown in FIGS. 16 and 17, the completed heat shield 200 is formed by using rivets 220 to attached mounting hardware members 222, 224, and 226 to the second intermediate product 218. Mounting hardware members 222, 224, and 226 are configured to be clipped and bolted to the engine (not illustrated) and to support the heat shield 200 at the desired position to protect the transmission unit (not illustrated).

It will be understood that the above description of the present invention is susceptible to various modifications, changes, and adaptations, and the same are intended to be comprehended within the meaning and range of equivalents of the appended claims.

What we claim is:

1. A heat shield for use with an internal combustion engine, comprising:
   a sheet metal wrapper member having a cover portion and flanges extending from the cover portion;
   an insulation member made from flexible sheet material, the insulation member contacting the cover portion of the wrapper member;
   a support having an elongated spine and mounting legs which extend from the spine, the spine being disposed between the cover portion of the wrapper member and the insulation member; and
   an outer member made from sheet material, the outer member contacting the insulation member, the flanges of the wrapper member being bent to press against the outer member so as to secure the outer member, insulation member, and support to the wrapper member without adhesive,
   wherein the cover portion of the wrapper member has a non-planar shape and the insulation member and the outer member conform to the non-planar shape.

2. The heat shield of claim 1, wherein the cover portion of the wrapper member has a periphery and the flanges extend substantially all the way around the periphery except at predetermined regions, the mounting legs of the support joining the spine of the support adjacent the predetermined regions.

3. The heat shield of claim 2, wherein the heat shield, has a plurality of arcuate regions which are spaced apart from one another and a plurality of co-planar flat regions which are spaced apart from one another, each flat region being disposed adjacent at least one arcuate region, and wherein the mounting legs of the support are disposed at the flat regions.

4. The heat shield of claim 2, wherein the outer member comprises an outwardly facing electrically insulating layer.

* * * * *